United States Patent
Cummins et al.

[11] 3,957,315
[45] May 18, 1976

[54] BRAKE CONTROL SYSTEM WITH PROPORTIONAL LOADING OF THE BRAKES DURING RETARDING

[75] Inventors: Curtis Farris Cummins, Decatur; Kenneth Wayne Kelly, Warrensburg, both of Ill.

[73] Assignee: Caterpillar Tractor Co., Peoria, Ill.

[22] Filed: Nov. 15, 1974

[21] Appl. No.: 524,118

[52] U.S. Cl. ................................. 303/6 C; 188/170; 188/349; 303/7; 303/13; 303/28; 303/84 A; 303/71
[51] Int. Cl.² .......................................... B60T 8/26
[58] Field of Search .............. 303/13, 2, 7, 6 R, 6 C, 303/9, 14, 28, 30, 40, 68, 71, 84; 188/170, 349, 264

[56] References Cited
UNITED STATES PATENTS

| | | | |
|---|---|---|---|
| 3,190,700 | 6/1965 | Fites | 303/6 C |
| 3,456,988 | 7/1969 | Gibbons et al. | 303/13 X |
| 3,582,150 | 6/1971 | Williams et al. | 303/13 X |
| 3,601,451 | 8/1971 | Cummins et al. | 303/13 |
| 3,697,138 | 10/1972 | Marting | 188/349 X |
| 3,709,563 | 1/1973 | Shellhause | 303/6 C |
| 3,901,556 | 8/1975 | Prillinger et al. | 303/2 X |

*Primary Examiner*—Trygve M. Blix
*Assistant Examiner*—Douglas C. Butler
*Attorney, Agent, or Firm*—Phillips, Moore, Weissenberger Lempio & Strabala

[57] ABSTRACT

A vehicle with at least front and rear sets of brakes includes a pair of brake control valves for normally communicating a source of pressurized fluid to individually control the brakes, a counterpart pair of inversion valves for normally supplying air piloting pressure to the brake control valves, and a retarding valve system communicating a source of pressurized air at one value to one inversion valve and at a proportionately lower pressure to the other inversion valve so that one set of brakes absorbs less energy than the other set of brakes in a retarding mode. The brake control system also includes a service brake valve actuatable to delivery equal pressure to both inversion valves for absorbing equal energy in both sets of brakes in an overriding manner with respect to the retarding valve system.

12 Claims, 1 Drawing Figure

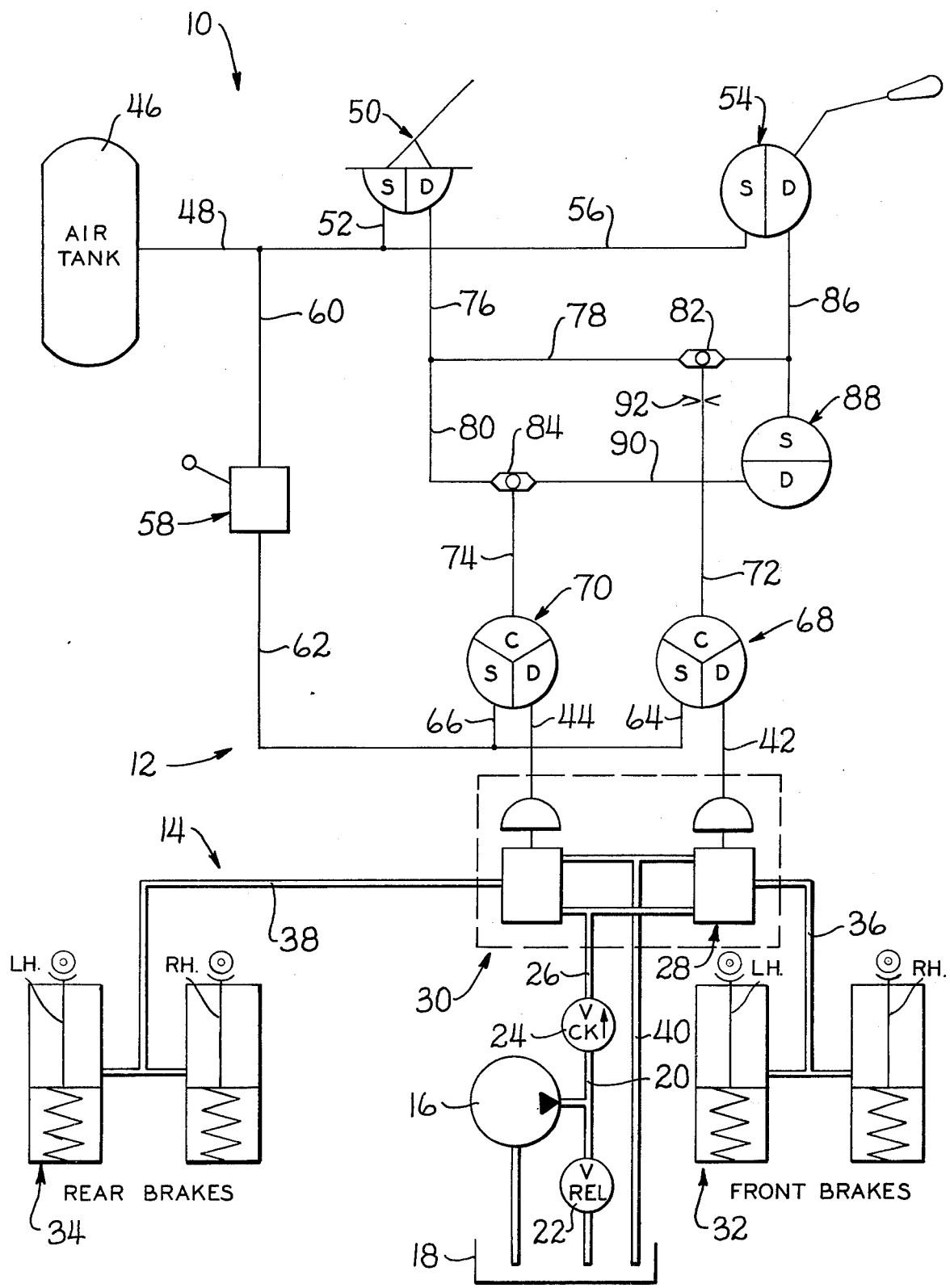

BRAKE CONTROL SYSTEM WITH PROPORTIONAL LOADING OF THE BRAKES DURING RETARDING

BACKGROUND OF THE INVENTION

The present invention relates to brake control systems and pertains particularly to a brake control system having a retarding mode of operation.

Heavy material-carrying vehicles which must travel down long, steep grades have brake-retarding requirements which are distinct from the relatively infrequent service braking needs. For instance, it is normal to establish a preselected intermediate setting of the brakes during a downhill run for retarding, but such condition results in the necessity for absorbing a considerable amount of energy in the individual brakes for a relatively long period of time. This energy must be efficiently dissipated in order to increase the service life of the brakes and prevent early brake failure.

Sophisticated oil-cooled, disc-type brakes with associated cooling systems are being developed by the industry to accomplish this dissipation of energy. In contrast, service braking requirements are usually intermittent and less total energy is thereby absorbed. But service braking has a greater need than retarding for emergency maximum energy absorption. These factors indicate a need for separate retarding control and the possibility of differentially sizing the brake sets and their cooling capacities at the front and rear of the vehicle.

Another safety factor should also be considered with tractor-trailer combination vehicles. With service braking, for example, it is desirable to either delay the application of the brakes at the front of the vehicle with respect to the rear or to generally absorb similar amounts of energy at both locations. Such action will generally avoid a relatively dangerous condition known as jackknifing, wherein the heavier trailing portion of the vehicle tends to overrun the otherwise more quickly decelerating forward portion. On the other hand, retarding requirements are generally not as severe in this regard. It is therefore desirable to consider these safety parameters along with the other above-mentioned factors to provide a control system that differentially apportions energy absorption to the front and rear sets of brakes in a manner which more effectively and economically matches these sets of brakes and their associated cooling systems.

SUMMARY AND OBJECTS OF THE INVENTION

It is the primary object of the invention to provide a brake control system that overcomes the above problems of the prior art.

Another object of the present invention is to provide a brake control system that includes retarding control means.

A further object of the present invention is to provide a brake control system that includes retarding control means that is operative to proportion brake loading in accordance with energy absorption capabilities of the respective brakes.

In accordance with the present invention, a brake control system is provided with a retarding brake control separate from the service brake control that is operative to apportion braking effort among the braking wheels in accordance with the energy-absorbing capacicty of the respective wheels.

BRIEF DESCRIPTION OF THE DRAWINGS

These and other objects and advantages will become more apparent from the following description when read in conjunction with the accompanying drawing wherein the single FIGURE is a schematic layout of a control system embodying the present invention.

DESCRIPTION OF A PREFERRED EMBODIMENT

Referring now to the drawing, there is illustrated a brake control system indicated generally at 10 for a vehicle having front and rear braked wheels, such as an earthmoving tractor scraper vehicle or the like which includes an air pilot control system indicated generally at 12 and shown in single-line schematic form in the upper portion of the drawing which pilotably actuates a hydraulic control system indicated generally at 14 and shown in double lines in the lower portion. The hydraulic control system includes a source of pressurized fluid such as an engine-driven pump 16 which normally delivers hydraulic fluid from a reservoir 18 to an outlet conduit 20 at a predetermined pressure, such as, for example, 400 psi, as established by a relief valve 22. A pressure protection or safety check valve 24 is mounted between the outlet conduit 20 and a supply line 26 to assure that the supply line remains pressurized in the event of a sudden engine or pump failure or the like. Normally, the supply line 26 communicates pressurized fluid to a pair of pilot-operated brake control valves 28 and 30 and therethrough to two sets of oil-cooled, disc-type brakes 32 and 34 which are spring-applied and hydraulically released. In this example the front brakes have a greater cooling capacity than the rear brakes. The front brakes may, for example, be the brakes of a towing tractor wherein brake cooling fluid is available and the rear brakes may be on the trailer.

The front brake control valve 28 normally communicates hydraulic pressure in the supply line 26 to an outlet conduit 36 leading to the front set of brakes 32 to maintain them in a released condition, while the rear brake control valve 30 similarly communicates pressurized fluid to an outlet conduit 38 leading to the rear set of brakes 34 to maintain them disengaged.

These brake control valves individually communicate with a fluid return line 40 for the return of fluid to reservoir or tank 18. A pair of controlling air pilot or delivery conduits 42 and 44, respectively, communicate pilot control fluid to the valves 28 and 30. Both brake control valves are similar and preferably function on a linear basis at a ratio of approximately 4:1 with respect to the controlling input pressure. Thus, for example, 100 psi air pressure at either pilot control conduit 42 or 44 is effective to allow delivery of 400 psi fluid pressure from the supply line 26 to either outlet conduit 36 or 38 respectively.

Likewise, the piloting air control system 12 includes an air supply system or source generally indicated at 46 which delivers pressurized air at a predetermined pressure, for example 100 psi, to an air supply line 48. This supply line communicates with a foot-operated service brake valve 50 through a branch conduit 52, a hand-operated retarding brake valve 54 through a branch conduit 56, and to a hand-operated emergency and parking brake valve 58 through a branch conduit 60. The emergency brake valve 58 is normally open so that substantially full pressure (100 psi) is available in an output conduit 62 leading therefrom. Therefore, air at aupply pressure is normally available at branch supply conduits 64 and 66 communicating with a pair of inversion valves 68 and 70, respectively. These inversion valves are substantially identical and are of the type disclosed for example in U.S. Pat. No. 3,601,451, and are individually coupled with the delivery conduits 42 and 44 leading to the brake control valves 28 and 30, as well as a pair of control conduits 72 and 74 leading thereto. These inversion valves function on a linear 1:1 basis so that the absence of pressure in either control conduit 72 or 74 permits air at substantially full pressure to be communicated with the delivery conduits 42 and 44. Further, if the pressure in either control conduit 72 and 74 is raised to 30 psi, for example, then only 70 psi is delivered to the conduits 42 and 44.

The service brake valve 50, when actuated, is effective to deliver air through a delivery conduit 76 and branch conduits 78 and 80 to check valve arrangements 82 and 84, respectively. When the service brake valve is actuated these check valve arrangements serve to directly communicate the delivery conduits 72 and 74 with the branch conduit 78 and 80 respectively. On the other hand, while check valve arrangement 82 directly communicates with the retarding brake valve 54 through a delivery conduit 86, the check valve arrangement 84 communicates only indirectly with the delivery conduit 86 through a ratio or proportioning valve 88 and an interconnecting, reduced-pressure signal line 90. A flow-limiting valve or orifice 92 is disposed in the control conduit 72 for the general purpose of delaying the application of the front brakes 32 with respect to the rear brakes 34 for safety reasons as set forth previously.

OPERATION

It may thus be appreciated that when a retarding mode is desired, the retarding brake valve 54 is actuated to deliver something less than the supply pressure of 100 psi, such as 30 psi, to the conduit 86. Such pressure is communicated through the check valve arrangement 82 and a control conduit 72 to impose a signal pressure on the inversion valve 68, which in turn is effective to deliver 70 psi pressure to the air pilot conduit 42. But, since the ratio valve 88 is effective to proportionately decrease the inlet and outlet pressures thereof to some 75% of the input value the 30 psi input signal in conduit 86 is reduced to a 22.5 psi value at the signal line 90. This reduced pressure is similarly communicated through the check valve arrangement 84 and the control conduit 74 to the inversion valve 70 whereupon the delivery pressure is reduced to 77.5 psi to the air pilot conduit 44.

The brake control valves 28 and 30 thus pilotably receive these 70 psi and 77.5 psi signals and are effective to deliver 280 psi and 310 psi to the outlet conduits 36 and 38 associated therewith so that the rear brakes 34 are released to a greater degree or alternatively are applied at a lesser degree than the front brakes 32. This reduces the heat energy that must be dissipated by the rear brakes and permits a smaller cooling system to be incorporated therewith.

In the event that the service brake valve 50 is actuated at the same time that the retarding brake valve 54 is functionally operating, then the check valve arrangements 82 and 84 effectively block the pressure in the conduits 86 and 90, respectively. In this manner, the service brake valve 50 overrides the retarding brake valve 54 and momentarily applies equal pressure to both inversion valves 68 and 70 and thence to the front and rear brake sets 32 and 34 through the brake control valves 28 and 30.

It also is obvious that the retarding brake valve 54 and the ratio valve 88 may be combined to provide a single retarding valve system with two delivery lines having a proportional pressure ratio leading to the check valve arrangements 82 and 84, without departing from the spirit of the present invention.

A number of advantages of this brake system include the automatic application of the spring-applied brakes under a variety of broken line or reduced air pressure conditions, the ability of the emergency valve 58 to be actuated so that the supply of pressurized air would be discontinued to both inversion valves 68 and 70 and both sets of brakes would be equally applied, the ability of the hydraulic control system 14 not to apply the brakes in the event of the failure of the pump 16, and the general economic advantages of an air-over-oil system.

While the present invention has been illustrated and described with respect to a single embodiment, it is to be understood that numerous changes and modifications may be made therein without departing from the spirit and scope of the invention as defined by the appended claims.

What is claimed is:

1. A brake control system for a vehicle having at least front and rear sets of wheels to be braked, said system comprising:
    front friction brake means for braking the front wheels of a vehicle and rear friction brake means for braking the rear wheels of a vehicle said front and said rear friction brake means having different energy-dissipating capacities;
    a source of pressurized fluid for controlling the application of both of said brake means;
    service brake control means for controlling the application of both of said brake means in a first ratio of pressure of said front brake means to said rear brake means for a normal mode of operation including full application of both of said brake means;
    retarding brake control means for controlling the application of said both brake means in a second ratio of pressure between said front brake means to said rear brake means for a retarding mode of operation limited to an intermediate setting of less than full application of both of said brake means; and,
    said retarding brake control means includes means for apportioning the pressure of said fluid between said front and rear brake means for controlling the application of both of said brake means in proportion to the energy-dissipating capacity of the respective front and rear brake means.

2. A brake control system for a vehicle having at least front and rear sets of wheels to be braked, said system comprising:
    front friction brake means for braking the front wheels of a vehicle and rear friction brake means for braking the rear wheels of a vehicle;
    a source of pressurized hydraulic fluid for the operating fluid for controlling the application of both of said brake means;
    a source of air pressure means for pilot control of said operating fluid;
    a separate pilot-operated brake control valve for controlling the communication of hydraulic pressure to each said front and rear brake means;

service brake control means including a service brake valve for directing air pressure from said source for operation of said brake control valves for controlling the application of both of said brake means for a normal mode of operation;

retarding brake control means including a retarding brake valve for directing air pressure from said source for operation of said brake control valves for controlling both of said brake means for a retarding mode of operation; and, said retarding brake control means including a ratio control valve for differential operation of said brake control valves when controlled by said retarding brake valve for apportioning the pressure of said fluid between said front and rear brake means for controlling the application of said brakes in proportion to the energy-dissipating capacity of the respective brake means.

3. The brake system of claim 2 wherein said brakes are spring-applied and hydraulic pressure-released.

4. The brake control system of claim 3 wherein said service brake valve and said retarding brake valve are connected in parallel; and, overriding means for enabling said service brake valve to override said retarding brake valve.

5. The brake control system of claim 4 wherein said overriding means comprises shuttle valve means disposed between the connection of said service brake valve and said retarding brake valve to said brake control valves and responsive to fluid from said service brake valve for overriding and cutting off fluid from said retarding brake valve.

6. A brake control system for a vehicle having at least front and rear sets of wheels to be braked, said system comprising:

front friction brake means for braking the front wheels of a vehicle and rear friction brake means for braking the rear wheels of a vehicle;

spring means for applying both of said brake means;

a source of pressurized hydraulic fluid for controllably releasing both of said brake means;

a source of air pressure for controlling said hydraulic fluid;

service brake control means for controlling the application of both of said brake means for a normal mode of operation;

retarding brake control means for controlling both of said brake means for a retarding mode of operation; and, said retarding brake control means includes means for apportioning the pressure of said fluid between said front and rear brake means for controlling the application of said brake in proportion to the energy-dissipating capacity of the respective front and rear brake means.

7. The brake control system of claim 6 comprising:

a pair of pilot-operated brake control valves for controlling the direction of hydraulic fluid for release of said brakes;

a service brake valve for directing air pressure from said source for simultaneous pilot control of said brake control valves; and, a retarding brake valve for directing air pressure from said source for differential pilot control of said brake control valve for controlling the application of said front and rear brake means in proportion to the energy-dissipating capacity thereof.

8. The brake control system of claim 7 comprising a ratio valve disposed between said retarding valve and one of said brake control valves for reducing the pilot pressure communicated thereto.

9. The brake control system of claim 7 wherein said service brake valve and said retarding brake valve are connected in parallel between said source of air pressure and said brake control valves.

10. The brake control system of claim 9 including shuttle valve means disposed between the connection of said service brake valve and said retarding brake valve to said brake control valves so that said service brake valve can override said retarding brake valve.

11. The brake control system of claim 6 comprising a pressure-protection valve operative to retain pressure in the hydraulic control system in the event the source becomes inoperative.

12. The brake control system of claim 6 comprising an emergency brake valve operative to override the service brake valve and the retarding brake valve.

* * * * *